United States Patent [19]

Kumar et al.

[11] 4,354,858
[45] Oct. 19, 1982

[54] METHOD FOR FILTERING PARTICULATES

[75] Inventors: Tribhawan Kumar, Oakland, Calif.; Kris E. Wolpert, Harrisburg, Pa.

[73] Assignee: General Electric Company, Schenectady, N.Y.

[21] Appl. No.: 296,614

[22] Filed: Aug. 27, 1981

Related U.S. Application Data

[63] Continuation of Ser. No. 172,326, Jul. 25, 1980, abandoned.

[51] Int. Cl.³ ............................................. B01D 53/00
[52] U.S. Cl. .................................... 55/6; 55/97; 55/131; 55/DIG. 5; 55/124
[58] Field of Search ................ 55/2, 6, 97, 124, 126, 55/131, 132, 138, DIG. 5; 422/121

[56] References Cited

U.S. PATENT DOCUMENTS

| | | | |
|---|---|---|---|
| 1,931,436 | 10/1933 | Deutsch | 55/131 |
| 1,980,521 | 11/1934 | Hahn | 55/2 |
| 3,733,784 | 5/1973 | Anderson et al. | 55/138 |
| 3,798,521 | 3/1974 | Schmidt-Burbach | 55/131 |
| 3,910,779 | 10/1975 | Penney | 55/131 |
| 3,986,851 | 10/1976 | Grodek | 55/97 |
| 4,029,482 | 6/1977 | Postma et al. | 55/131 |
| 4,200,440 | 4/1980 | Renko | 55/131 |
| 4,227,894 | 10/1980 | Proynoff | 55/126 |
| 4,266,948 | 5/1981 | Teague et al. | 55/131 |

FOREIGN PATENT DOCUMENTS 438834 7/1922 Fed. Rep. of Germany ........ 55/138

Primary Examiner—David L. Lacey
Attorney, Agent, or Firm—Ernest F. Chapman

[57] ABSTRACT

Electrically charged particulates in a gas stream are filtered from the gas stream by a filter medium comprising a porous cake composed of electrically charged particulates previously drawn from the gas stream and collected on a foraminous support structure, where the apertures of the foraminous support structure are larger than the average size of the particulates to be filtered from the gas stream by more than an order of magnitude.

6 Claims, 7 Drawing Figures

METHOD FOR FILTERING PARTICULATES

This is a continuation of application Ser. No. 172,326, filed July 25, 1980, now abandoned.

BACKGROUND OF THE INVENTION

1. Field of the Invention

The present invention pertains to the filtration of particulates from a gas stream by means of a filter cake composed of particulates previously drawn from the gas stream.

More particularly, the present invention pertains to method for filtering a particulate-laden gas stream by forming a filter cake comprising particulates drawn from the particulate-laden gas stream, the porosity of the filter cake being such as not to impede the flow therethrough of the gas stream.

2. State of the Art

A technique for electrostatically attracting charged particulates from a gas stream onto metallic collecting structures was described in U.S. Pat. No. 1,931,436 to Walther Deutsch. The metallic collecting structures described by Deutsch were configured so as to maximize the surface areas providing deposition sites for the charged particulates.

In the Deutsch patent, the primary filtration mechanism was the deposition of the particulates directly on the metallic collecting structures. According to the technique described by Deutsch, the particulates deposited on the collecting structures were continually removed therefrom in order to maximize the metallic surface area exposed to the charged particulates in the gas stream.

The use of a cake of particulates drawn from a gas stream as the primary filter medium for removing subsequent particulates from the gas stream was described in U.S. Pat. No. 3,910,779 to Gaylord W. Penney. According to the technique described by Penney, the particulates in the gas stream were electrically charged in a corona region, and were then carried by the gas stream to a separate filtering region downstream of the corona charging region. In the filtering region, a textile fabric filter was mounted on a metalic support structure, with a non-corona electric field being maintained at the collecting surfaces of the filter. According to Penney, no corona should be permitted near the particulate collecting surfaces of the filter.

There was no suggestion in the prior art, however, to use a filter cake formed by the deposition of electrostatically attracted charged particulates directly onto an apertured collecting structure as the primary filter medium for removing subsequent particulates from a gas stream, where the size of the apertures of the collecting structure is more than an order of magnitude larger than the average size of the particulates to be removed from the gas stream.

Where screens or other foraminous collecting structures were used in the prior art to collect electrically charged particulates drawn from a gas stream, the consensus of practitioners skilled in the art was that the apertures of the collecting structures must be not more than an order of magnitude larger than the average size of the particulates to be collected.

OBJECTS OF THE PRESENT INVENTION

It is an object of the present invention to provide a filter medium for removing particulates from a particulate-laden gas stream, the filter medium comprising a cake of particulates electrostatically drawn from the gas stream onto a foraminous collecting structure, neither the particulate cake nor the foraminous collecting structure substantially impeding the flow therethrough of the gas stream cleaned of its burden of particulates.

It is likewise an object of the present invention to provide a method and apparatus for forming a filter cake of particulates drawn from a gas stream by imparting electric charge to the particulates, and then electrostatically attracting the charged particulates to a foraminous collecting structure upon which the filter cake is formed, neither the filter cake nor the foraminous collecting structure causing a significant impedance to the flow therethrough of the gas stream cleaned of its burden of particulates.

It is a feature of the present invention that a filter medium composed of a foraminous collecting structure having apertures that are more than an order of magnitude larger than the size of the particulates to be filtered from the gas stream. Thus, an apparatus according to the present invention has a foraminous collecting structure on which the filter medium is formed, with the foraminous collecting structure having apertures larger than the size of the particulates to be filtered by more than an order of magnitude.

DESCRIPTION OF PREFERRED EMBODIMENTS

Figure 1:
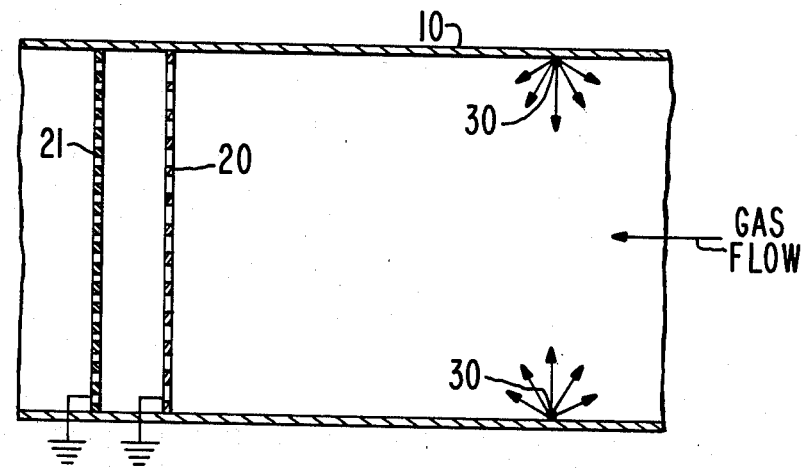
FIG. 1 is a cross-sectional plan view of an apparatus according to the present invention in which particulates in a gas stream are electrically charged by a diffusion charging means located upstream of a pair of electrically grounded foraminous collecting structures of planar configuration.

A number of alternative configurations for apparatus according to the present invention are shown in the drawing, including a variety of means for imparting electric charge to particulates in a gas stream and a variety of structures for collecting charged particulates.

The fundamental concept of the present invention can be appreciated from a consideration of the apparatus shown in FIG. 1. As indicated by the arrow pointing to the left, a particulate-laden gas stream, which could be for example the flue gas from a coal-fired furnace, is directed through a conduit 10.

Mounted in the conduit 10 athwart the path of the gas stream are an upstream foraminous collecting structure 20 and a downstream foraminous collecting structure 21. The upstream collecting structure 20 is a metallic device that is electrically grounded. Preferably, the upstream collecting structure is a wire screen, although it could be a perforated plate. The mesh of the screen comprising the upstream collecting structure 20, or the dimension of the perforations in the case of a perforated plate, is such that the apertures through which the gas stream passes are larger than the average size of the particulates to be removed from the gas stream by more than an order of magnitude.

Experimental evidence indicates that filtration efficiency for particulates of a size smaller than five microns is unaffected by whether the downstream collecting structure 21 is metallic or dielectric. As shown in FIG. 1, the downstream collecting structure 21 is metallic and is electrically grounded. However, such a metallic downstream collecting structure could be maintained at any electric potential of the same polarity as electric charge imparted to the particulates in the gas stream by an upstream charging means.

The downstream collecting structure 21 could alternatively be made of a dielectric fabric material. The apertures in the downstream collecting structure 21 through which the gas stream passes must be no larger, and preferably are smaller, than the apertures in the upstream collecting structure 20. The apertures in the downstream collecting structure 21, however, must be large enough to prevent any substantial impedance to the flow of the gas stream through the conduit 10. The amount of separation between the downstream collecting structure 21 and the upstream collecting structure 20 does not appear to be critical.

Figure 2:
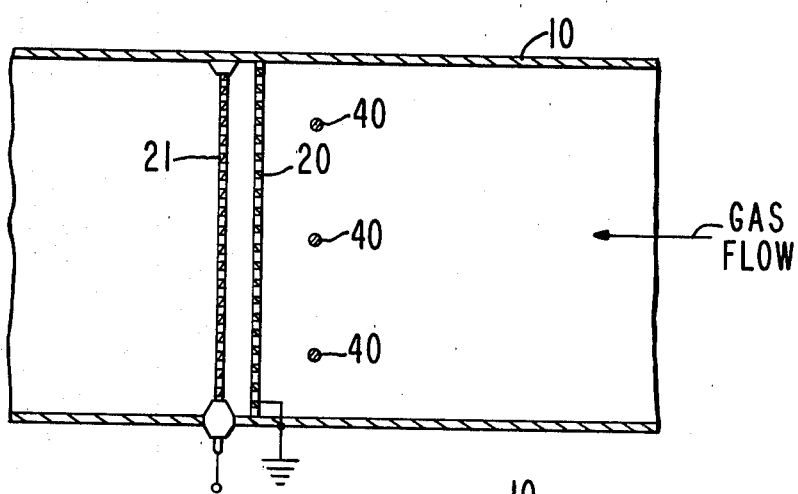
FIG. 2 is a cross-sectional plan view of an alternative apparatus according to the present invention in which particulates in a gas stream are electrically charged by a corona-generating means upstream of a pair of planar foraminous collecting structures.

As shown in FIG. 1, a diffusion charging means comprising, for example, one or more jet ionizers 30 mounted within the conduit 10 or on the interior walls thereof upstream of the collecting structure 20 causes electric charge to be imparted to the particulates in the gas stream. Alternatively, however, a corona-charging technique for imparting electric charge to the particulates in the gas stream could be used. As shown in FIG. 2, a plurality of high-voltage corona-generating electrodes 40 are positioned upstream of the upstream collecting structure 20. As shown in FIG. 2, the downstream collecting structure 21 is a metallic structure to which a voltage is applied of the same polarity as the electric charge imparted to the particulates in the gas stream by the coronas produced by the electrodes 40. However, as discussed above, the downstream collecting structure 21 could be electrically grounded, or could even be made of a dielectric material.

It was the consensus of practitioners in the prior art that a filter cake composed of particulates drawn electrostatically from a gas stream could effectively be formed on a foraminous collecting structure, only if the apertures of the collecting structure were not more than an order of magnitude larger than the average size of the particulates to be deposited thereon to form the filter cake. Surprisingly, therefore, it was discovered in a series of experimental investigations that led to the present invention that a filter cake of electrically charged particulates drawn from a gas stream can be formed on a foraminous collecting structure within a very short time after the particulates in the gas stream have been electrically charged, where the apertures of the collecting structure are larger than the average size of the particulates in the gas stream by more than an order of magnitude.

Thus, for a stream of gas bearing electrically charged particulates passing initially through the clean collecting structures 20 and 21 of an apparatus of the present invention as shown in FIG. 2, a portion of the electrically charged particulates from the gas stream are collected on the downstream collecting structure 21 by straightforward mechanical and electrical interception. Very quickly, a layer of such charged particulates forms on the downstream collecting structure 21. The charged layer then serves to prevent later-arriving charged particulates in the gas stream from passing through the apertures of the downstream collecting structure 21 because of electrostatic repulsion between the charged layer and the in-coming charged particulates.

The charged layer that builds up on the downstream collecting structure 21 repels later-arriving charged particulates back toward the upstream collecting structure 20, where the charged particulates are deposited on the upstream collecting structure 20 by mechanical and electrostatic forces. The charged particulates collecting on the upstream collecting structure 20 soon form a charged porous filter cake, which is effective in removing later-arriving particulates from the gas stream. The charged filter cake on the upstream collecting structure 20 becomes a porous structure of extremely fine "mesh", which effectively filters other particulates from the gas stream by mechanical as well as electrostatic forces. Very few particulates pass through the downstream collecting structure 21 after a charged layer of only microscopic thickness has built up thereon.

Figure 3:
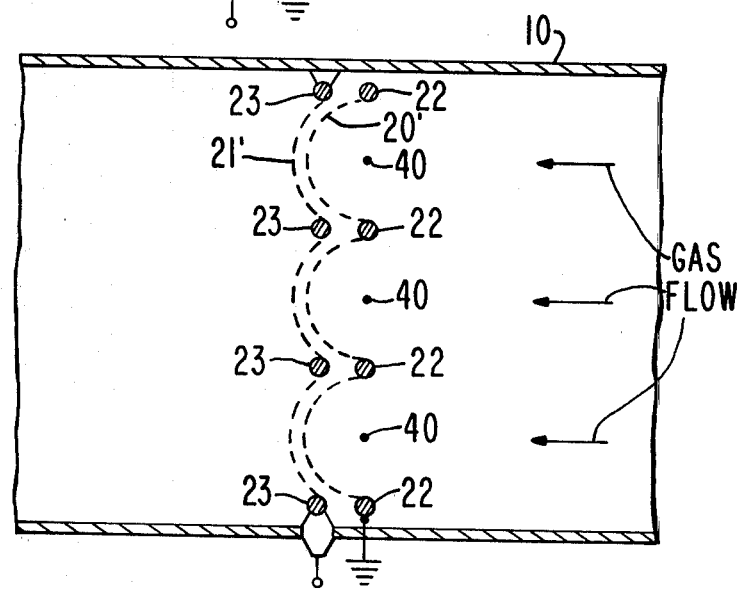
FIG. 3 is a cross-sectional plan view of an apparatus similar to that shown in FIG. 2, but having two foraminous collecting structures of non-planar configuration.

The collecting structures 20 and 21 of FIG. 2 need not necessarily be planar. As indicated schematically in FIG. 3, an upstream collecting structure 20' could be a rigid structure of non-planar configuration supported on a series of posts 22, and a downstream collecting structure 21' could be of similar non-planar configuration supported adjacent the upstream structure 20' on a series of posts 23.

The basic arrangement of the corona-generating electrodes and charged particulate collecting structures of an apparatus of the kind shown in FIG. 2 could be modified as required to meet the filtration capacity requirements for any particular particulate-laden gas stream. For example, in a large-capacity filtration apparatus shown as that shown in FIG. 4, a plurality of sets of collecting structures 200 are supported in a housing structure 100, which comprises an inlet conduit 110 for the particulate-laden gas stream, an outlet conduit 111 for the gas stream cleaned of its burden of particulates, and support structures 112 for mounting the collecting structures 200 within the housing 100. The bottom of the housing 100 may be configured to provide hoppers 120 for storage of excess particulate matter that can be periodically removed from the collecting structures 200 when the filter cake formed thereon becomes thicker than needed to accomplish the desired filtration of the gas stream. Each set of collecting structures 200 shown in FIG. 4 comprises an outer (or upstream) collecting structure 210 and an inner (or downstream) collecting structure 211. The outer collecting structure 210 has apertures that are larger than the average size of the particulates in the gas stream by more than an order of magnitude, and the inner collecting structure 211 has apertures that are smaller than the apertures of the outer collecting structure 210.

Figure 4:
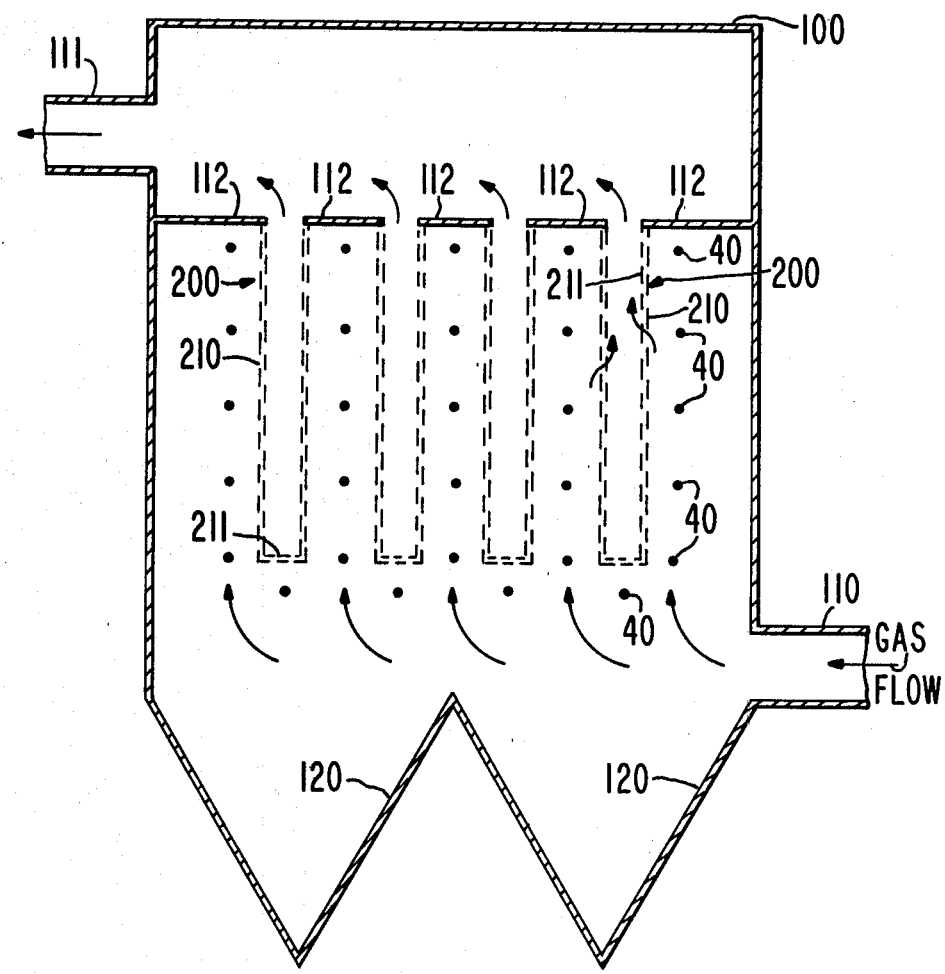
FIG. 4 is a cross-sectional side view of a large-capacity filtration apparatus according to the present invention.

With reference to FIG. 4, particulate-laden gas passing into the interior of the housing structure 100 via the inlet conduit 110 is drawn by a pressure difference maintained by conventional means (e.g., a fan) toward the outlet conduit 111. An array of horizontally disposed high-voltage corona-generating electrodes 40 is provided so that a generally uniform corona is established in the vicinity of the upstream side of each upstream collecting structure 210. Particulates in the gas stream acquire electric charge in passing through the corona, and the charged particulates form a filter cake on the outer collecting structure 210 in the manner described above for the upstream collecting structure 20 of FIG. 1.

Figure 5:
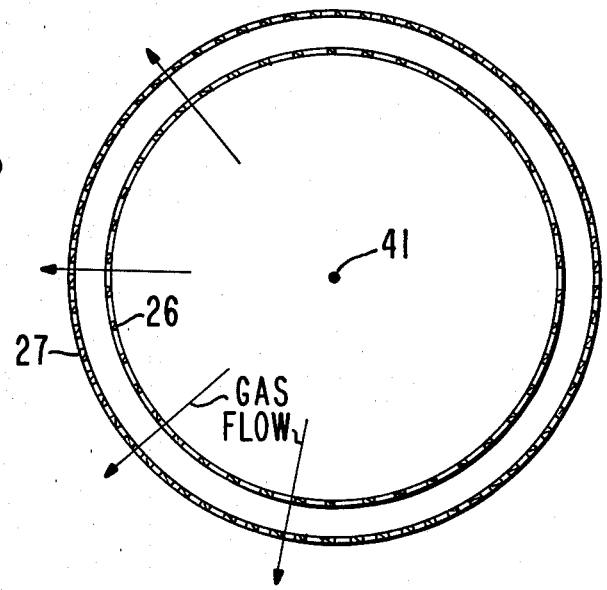
FIG. 5 is a cross-sectional plan view of an alternative apparatus according to the present invention in which particulates in a gas stream are electrically charged in a corona generated by an electrode disposed coaxially within two concentrically disposed cylindrical foraminous collecting structures.

Various other geometrical configurations for charged particulate collecting structures according to the present invention are possible. In FIG. 5, cylindrically configured collecting structures 26 and 27 are shown coaxially surrounding an elongate corona-generating electrode 41. One or more of such corona-generating electrodes 41, each electrode 41 being surrounded by inner and outer collecting structures 26 and 27, respectively, could be mounted in a housing structure in a conventional way such that a particulate-laden gas stream is directed into the interior of each of the inner collecting structures 26. The particulates in the interior of each inner collecting structure 26 would pass through a corona generated by the electrode 41, and thereby acquire electric charge. The charged particulates would then be deposited on the inner collecting structure 26, as the gas stream passes therethrough. The gas stream cleaned of its burden of particulates, passes through the apertures in the outer collecting structure 27 to a plenum for passage out of the housing.

Figure 6:
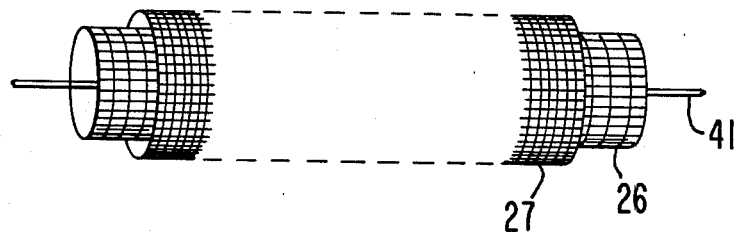
FIG. 6 is a perspective view of the apparatus of FIG. 5.

A perspective view of the arrangement of FIG. 5 is shown in FIG. 6. The orientation of the combination comprising the corona-generating electrode 41 and the surrounding cylindrical foraminous collecting structures 26 and 27 may be either vertical or horizontal—or in fact any convenient orientation—depending upon the design of the housing structure.

Figure 7:
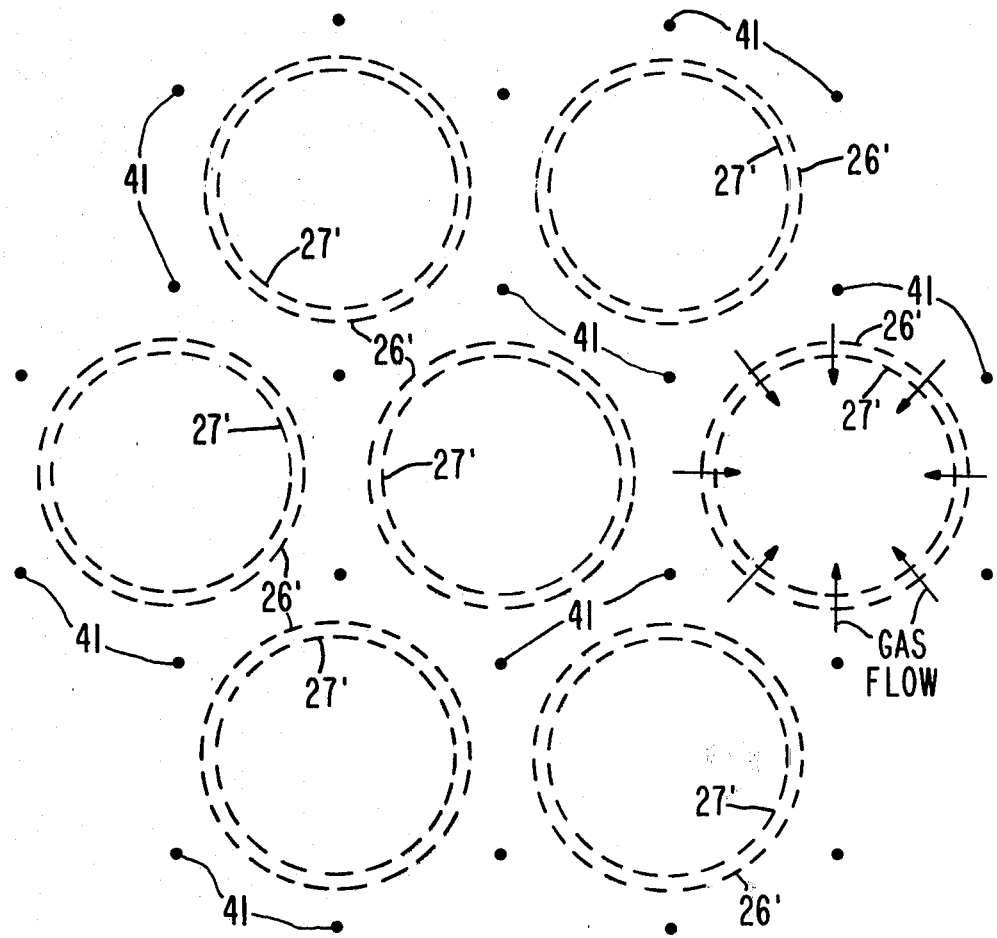
FIG. 7 is a cross-sectional plan view of an alternative apparatus according to the present invention in which particulates in a gas stream are electrically charged by corona-generating electrodes disposed outside of a plurality of sets of foraminous collecting structures, each set comprising two concentric cylindrical foraminous structures.

In another arrangement, as shown in FIG. 7, a plurality of corona generating electrodes 41 may be mounted outside a plurality of sets of cylindrical collecting structures, all within a gas-tight housing. Each set of collecting structures comprises concentrically disposed inner and outer foraminous collecting structures 26' and 27' respectively, of generally cylindrical configuration. The particulate-laden gas stream is introduced into the housing in which the electrodes 41 and the sets of collecting structures 26' and 27' are mounted, with the direction of gas flow through each set of collecting structures being such as to pass from outside the outer collecting structure 26' toward the interior of the inner collecting structure 27'.

The above-described arrangements are illustrative of preferred embodiments of apparatus for practicing the present invention. Other arrangements will become apparent to workers skilled in the art upon a perusal of the above specification and drawing, and upon consideration of the inventive concept disclosed therein. Thus, the invention is to be broadly construed according to the following claims.

What is claimed is:

1. An improved method for filtering particulates from a stream of particulate-laden gas comprising the steps of:
   (a) moving the gas including the particulates to be filtered as a stream;
   (b) imparting electrostatic charges to the particulates in the stream;
   (c) positioning across the path of the stream and downstream of the location at which the electrostatic charges are imparted to the particulates therein a metallic electrically grounded foraminous collecting structure having apertures of sizes larger than the average size of particulates to be filtered from the stream by more than an order of magnitude,
   (d) directing the gas stream containing the charged particulates through said collecting structure such that the electrostatically charged particulates are quickly accumulated as a porous filter cake by said collecting structure and are filtered from the gas stream.

2. The improved method of claim 1, further comprising positioning a second foraminous collecting structure across said stream downstream of said metallic electrically grounded foraminous collecting structure.

3. The improved method of claim 1, further comprising positioning across said stream downstream of said metallic electrically grounded foraminous collecting structure a second foraminous collecting structure having apertures smaller than the apertures of said metallic electrically grounded foraminous collecting structure.

4. The improved method of claim 1, further comprising positioning across said stream downstream of said metallic electrically grounded foraminous collecting structure a second metallic electrically grounded foraminous collecting structure.

5. The improved method of claim 1, further comprising positioning across said stream downstream of said metallic electrically grounded foraminous collecting structure a second metallic foraminous collecting structure, and maintaining said second foraminous collecting structure electrically charged with the same polarity as said electrostatically charged particulates.

6. An improved method for filtering particulates from a stream of particulate-laden gas comprising the steps of:
   (a) moving the gas including the particulates to be filtered as a stream;
   (b) imparting electrostatic charges to the particulates in the stream; and
   (c) positioning across said stream downstream of the location at which the electrostatic charges are imparted to the particulates therein a spaced pair of filter elements including,
      (i) a downstream foraminous collecting structure, and
      (ii) a metallic electrically grounded upstream foraminous collecting structure having apertures of sizes larger than the average size of particulates to be filtered from the stream by more than an order of magnitude and larger also than the size of the apertures in said downstream foraminous collecting structure,
   (d) directing the gas stream containing the charged particulates through the collecting structure such that the electrostatically charged particulates are quickly accumulated as a porous filter cake by said pair of filter elements and are filtered from the gas stream.

* * * * *